Figure 1:
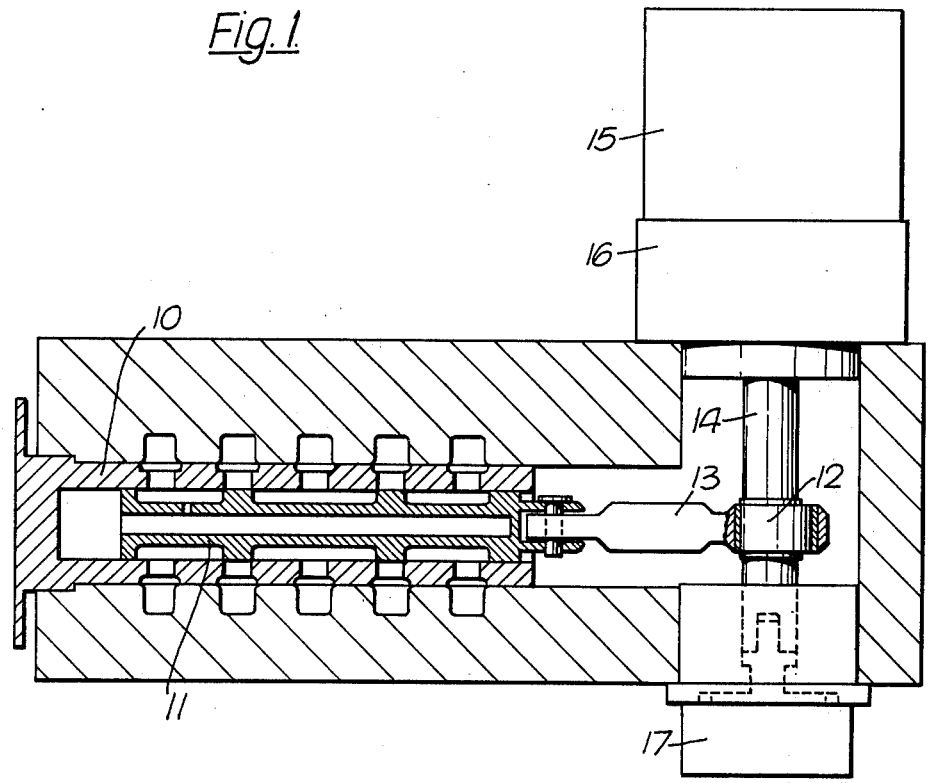

United States Patent [19]

Coles

[11] 4,190,081
[45] Feb. 26, 1980

[54] ELECTRO-HYDRAULIC SYSTEMS

[75] Inventor: Ernest F. Coles, Welwyn Garden City, England

[73] Assignee: Hawker Siddeley Dynamics Engineering, Ltd., Hatfield, England

[21] Appl. No.: 841,442

[22] Filed: Oct. 12, 1977

[30] Foreign Application Priority Data

Oct. 14, 1976 [GB] United Kingdom ............ 42695/76

[51] Int. Cl.$^2$ ............................................. F15B 13/044
[52] U.S. Cl. ............................. 137/624.27; 137/625.65
[58] Field of Search ..................... 137/624.27, 625.65

[56] References Cited

U.S. PATENT DOCUMENTS

| | | | |
|---|---|---|---|
| 3,921,666 | 11/1975 | Leiber | 137/596.16 X |
| 4,046,165 | 9/1977 | Rose, Sr. et al. | 137/624.27 |

FOREIGN PATENT DOCUMENTS 2456677  6/1976  Fed. Rep. of Germany ...... 137/625.65
46-13533  4/1971  Japan ................................. 137/625.65

*Primary Examiner*—Gerald A. Michalsky
*Attorney, Agent, or Firm*—Hall, Myers & Rose

[57] ABSTRACT

A valve assembly for regulating the amount or pressure of hydraulic fluid supplied to a hydraulically operated machine system comprises a progressively movable valve member, especially a rectilinearly-moving valve spool controlling ports in a ported valve sleeve, a motive power unit, such as an electric stepper motor, speed reducing coupling means such as a leadscrew or worm and worm wheel driving a rack and pinion, to convert the rotary output motion of the motor into valve motion, a valve member position feedback transducer, and an electrical controller controlling the motor in response to input command signals and the feedback signal. A manual override control lever, and a centering unit for centering the valve in the absence of hydraulic pressure, can also be provided.

3 Claims, 6 Drawing Figures

ELECTRO-HYDRAULIC SYSTEMS

This invention relates to the control of fluid flow in a hydraulic control system and in particular the invention is concerned with providing means enabling reliable control of the movement of a valve to be achieved in a contaminated environment.

The invention further seeks to provide a reliable interface between an electric/electronic controller and a hydraulic system. In the following discussion and description emphasis is placed upon the application of the invention to mining equipment. It is to be understood, however, that the invention is not so limited in application and could be applied to other uses.

With the increasing emphasis on automation in the mining industry and the increasing usage of computers and microprocessors to provide proportional and remote control of mining machines and equipment, a requirement exists for a reliable interface between the electric/electronic controllers and the machine hydraulic systems.

In electro-hydraulic systems where a high standard of component and fluid cleanliness can be achieved and maintained, the interface requirement can be met by a standard electro-hydraulic servo valve. Such valves, however, employ spools moving in sleeves with very small diametrical clearance and movement of the spool to direct the fluid flow is dependent on very small differential pressures acting on the spool. Because of the low forces available contaminant particles between the spool and sleeve will cause the spool to lock.

If reliable operation is to be achieved in systems using these valves the level of contamination that can be tolerated is very low. Filtration of 10 microns or better is essential and particular care has to be taken in topping-up fluid and monitoring its contamination level. In a mining environment 10 micron filter elements would require replacing too frequently to be practical and in any event do not protect the systems downstream of the valve. Even the process of changing the element could introduce contamination, as could topping up the system, unless done with special equipment.

With coal mining equipment the fluid contamination problem is further aggravated by the fact that to get the machinery to its working location it almost invariably has to be dismantled on the surface and reassembled underground. Since the initial build, cleaning and flushing of hydraulic servo systems, even in good workshop conditions, has to be done with great care if contamination of the fluid is to be avoided, then reassembly underground would present major problems.

Further problems can arise from contamination generated within the system, particularly from flexible hoses between the servo valve and the hydraulic cylinders or motors. Not only do the hoses and prime movers generate contaminant particles but the fact that the flow is bi-directional makes filtration difficult.

The most common cause of failure of electro-hydraulic servo valves used with contaminated fluid results from the entry of contaminant particles between the valve spool and sleeve preventing the movement of the spool in response to the small differential forces typically available in this type of valve.

According to the present invention, there is provided an electro-hydraulic servo valve assembly for regulating the amount or pressure of hydraulic fluid supplied to a hydraulically-operated machine system, comprising a progressively movable valve member, a motive power unit, means coupling the drive of the motive power unit to the valve member, a valve member position transducer supplying a feedback signal representative of the instantaneous position of the valve member, and electrical control means controlling the energisation of the motive power unit in accordance with input command signals and the feedback signal.

Forces equivalent to those available on manual control valves used in systems liable to fluid contamination, e.g. mining and similar machines, will be used.

While spool valves are referred to in this description, the same principle can be applied to other types of device used to control the flow of hydraulic fluid, e.g. rotary sleeve valves, rotary plate valves, sliding plate valves.

Figure 2:
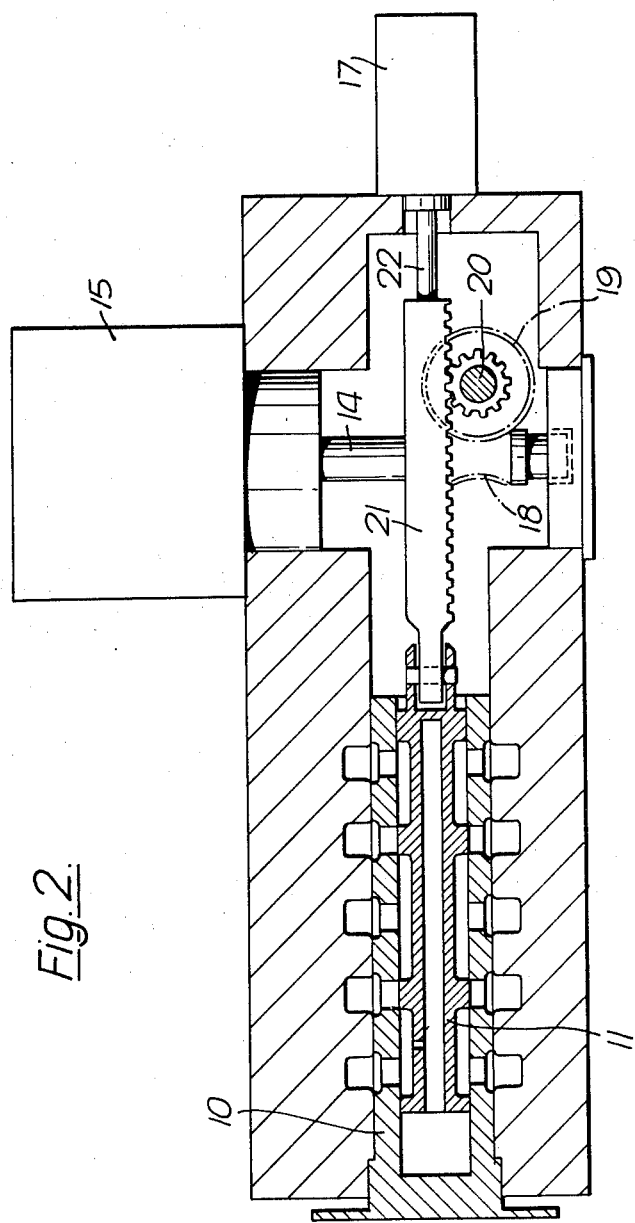
Figure 3:
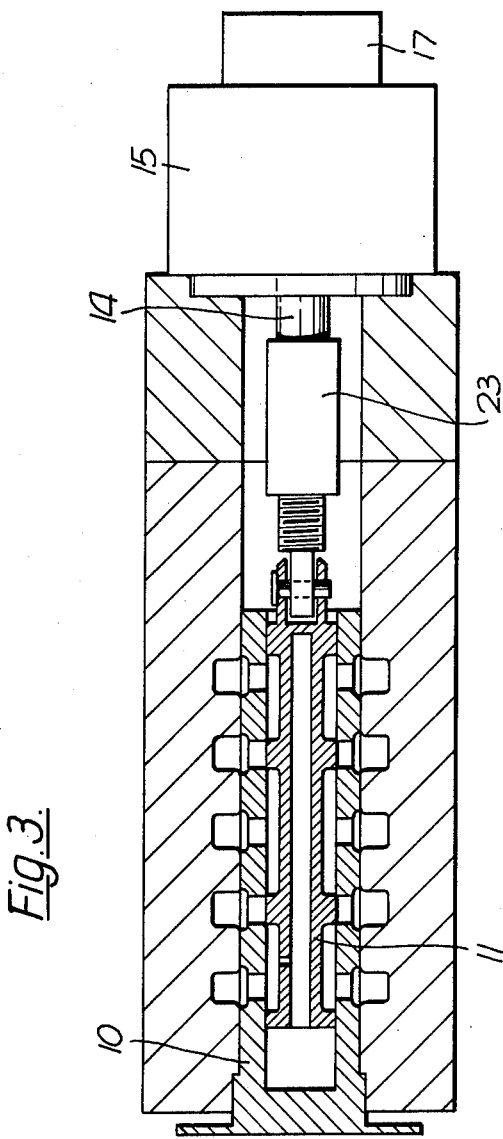
Figure 4:
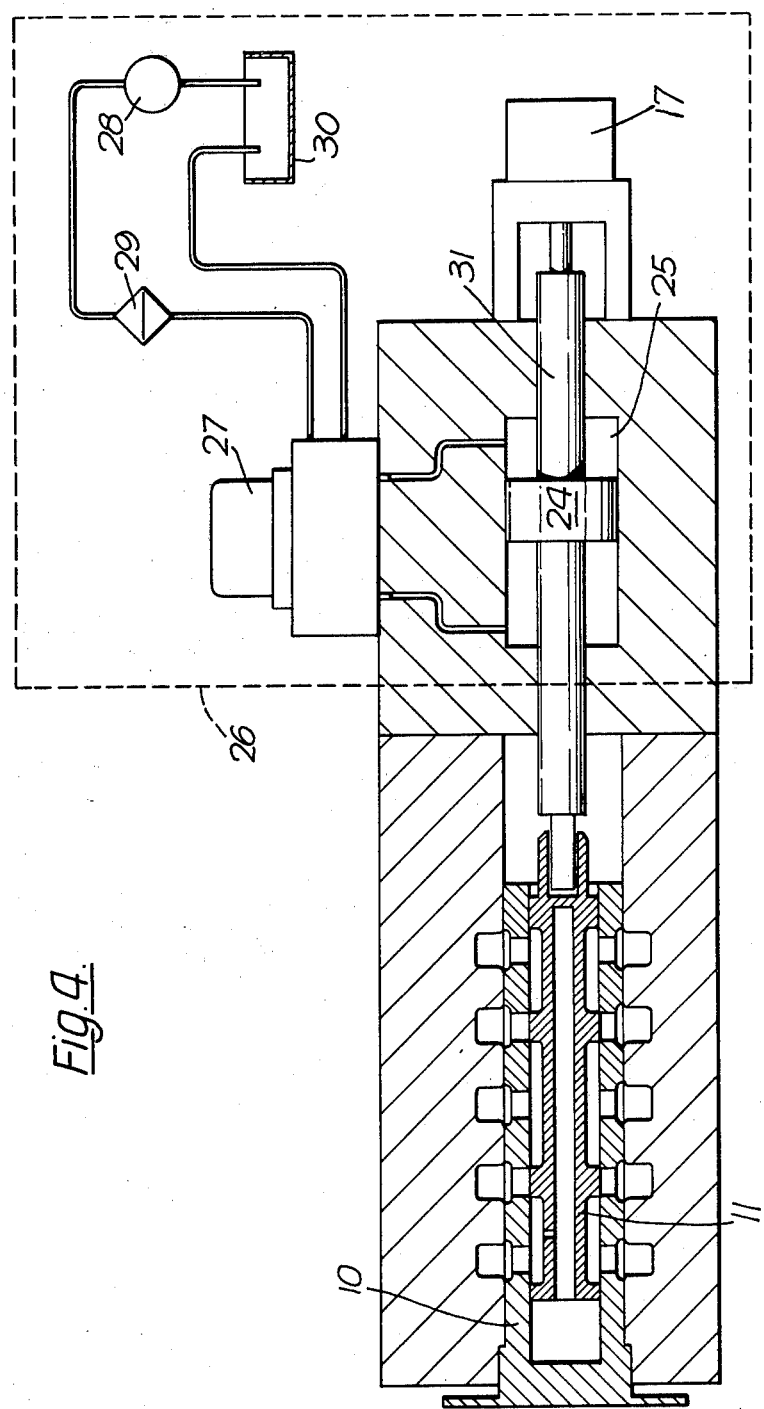
Figure 5:
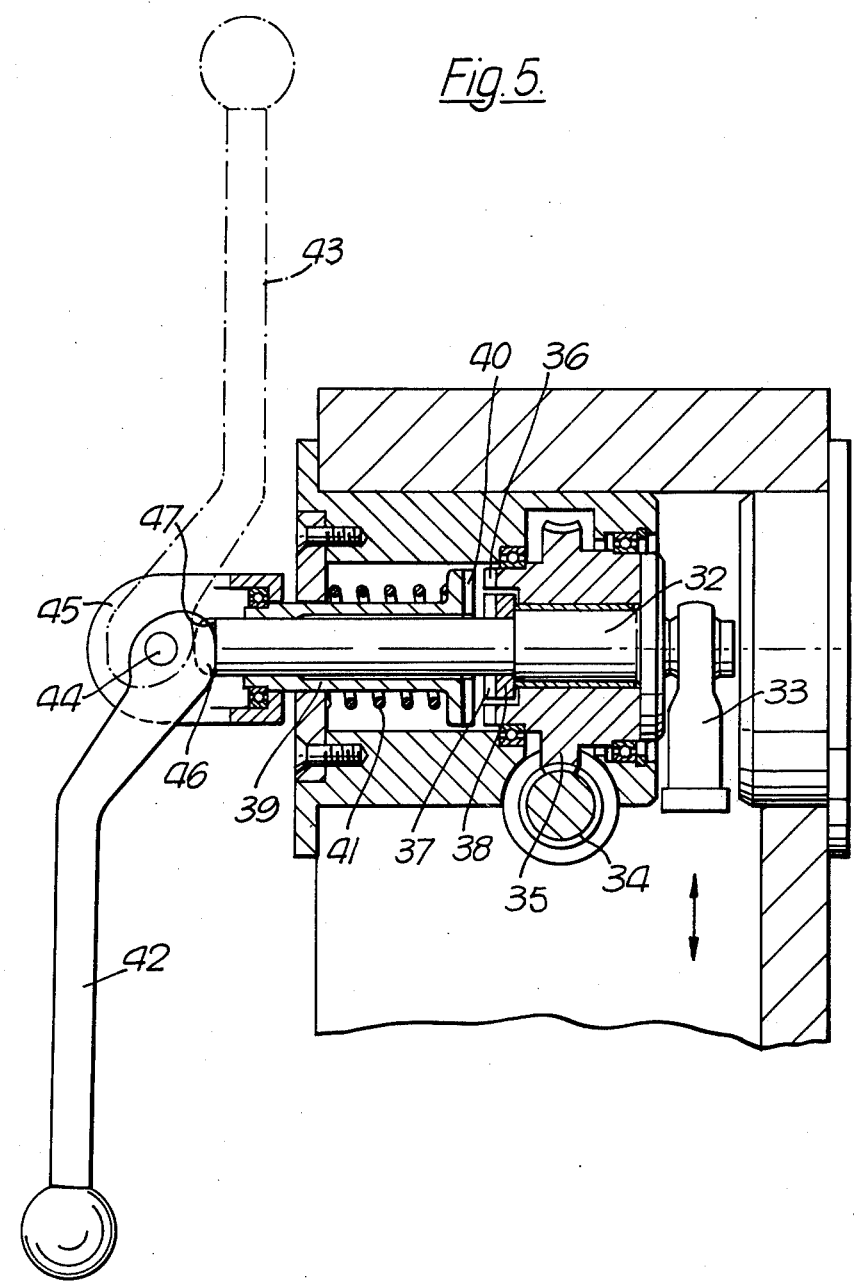
Figure 6:
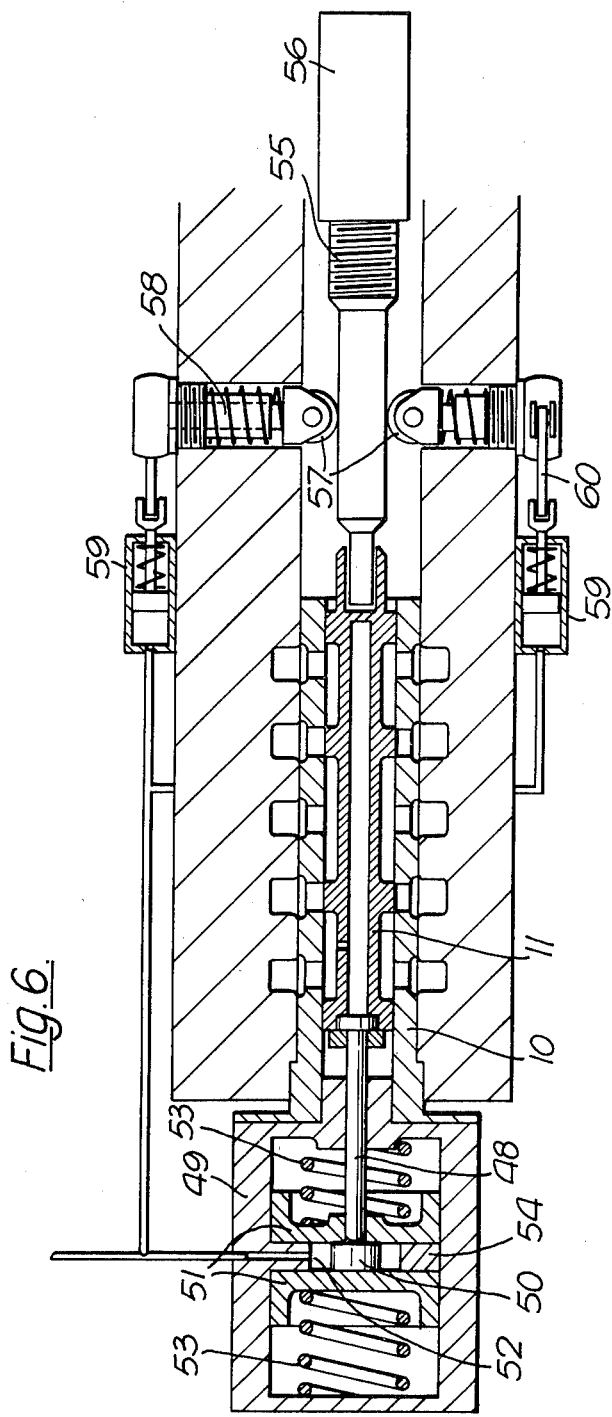

FIGS. 1 to 3 show several schematic arrangements of mechanical drives coupled to valve spools the movement of which will control the direction of fluid flow in a machine system, FIG. 4 shows an arrangement with hydraulic drive, FIG. 5 shows a worm drive arrangement having a manual override lever, and FIG. 6 shows an arrangement whereby the valve spool can be automatically centred.

The arrangements illustrated in FIGS. 1 to 3 lend themselves to the use of electric motors that will provide a convenient interface with electrical/electronic control systems. The motor selection is dependent on the type of control system with which it is required to interface; e.g. a stepping motor provides a particularly convenient interface with a microprocessor or digital computer, and it has in addition a particularly useful characteristic in providing maximum torque at minimum speed which means that maximum force is available when minimum movement is required, ensuring positive response around the null position.

A printed armature motor can be used to interface with an analogue system, particularly when a fast response is required.

In FIG. 1, the valve spool 11 sliding in a valve sleeve 10 is moved rectilinearly by an eccentric 12 acting through a coupling link 13. The eccentric 12 is mounted on a shaft 14 driven by an electric motor 15 through a speed-reduction gearbox 16. This permits a very high effective gear ratio providing a high spool driving force from a small motor. The arrangement is satisfactory if a low response time is acceptable and enables a system to be controlled from intrinsically safe electrical signals. A spool position feedback transducer 17 is also driven by the shaft 14.

In the arrangement of FIG. 2, the motor 15 drives the valve spool 11 via a worm 18 on the motor shaft 14 that is in mesh with a worm wheel 19 on the same spindle as pinion 20 engaging a rack 21 coupled to the spool. An extension 22 of the rack bar 21 operates the spool position transducer 17.

FIG. 3 illustrates an arrangement wherein the valve spool 11 is coupled to the motor 15 via a recirculating ball leadscrew 23. This can give a high response rate in cases where a relatively large drive motor is acceptable. The spool position transducer 17 is mounted on the motor housing to be driven directly by the motor shaft.

In FIG. 4, the valve spool 11 is driven by a hydraulic piston 24 in a cylinder 25 connected into a separate self-contained hydraulic system 26 controlled by a conventional electro-hydraulic servo valve 27. The self-contained system 26 incorporates its own pump 28, filter 29, tank 30 and cooling arrangement and is cleaned and sealed in the factory and so arranged that in the event of a failure it can be disconnected from the main system spool valve and replaced by another pre-cleaned and sealed unit. The defective unit would then be removed and rectified under clean controlled conditions. In this way, the exchange of powered control units can be accomplished in hostile environmental conditions without the need for special and impractical operation precautions.

Although the separate control system 26 in FIG. 4 is shown as hydraulically powered, a pneumatic powered servo-system could equally well be used. The main valve spool position transducer 17 is operated by an extension of the piston rod 31 of the piston 24.

In FIG. 5, the valve spool (not shown) is moved by a shaft 32 operating a crank 33. A motor-driven worm 34 meshes with a worm wheel 35 the hub of which is loose on the shaft 32. One end of the worm wheel 35 is provided with a ring of drive teeth 36 that surround another ring of drive teeth 37 of a shoulder 38 on the shaft 32, and a sleeve 39 slidable along the shaft has a further ring of teeth 40 which can be brought into simultaneous engagement with the teeth 36 on the worm wheel and the teeth 37 on the shaft 32 thereby coupling the motor drive to the shaft. A spring 41 normally urges the sleeve 39 into the engaged position.

A manual override lever 42 has an inoperative position, shown at 43, and an operative position, shown in full lines, in which latter it disengages the motor drive and engages with the shaft 32 so that the spool valve can be operated manually. The lever 42 is pivotally mounted at 44 on a trunnion 45 attached to the sleeve 39 and surrounding the end of the shaft 32. When the lever 42 is swung about its pivot 44 from the inoperative position 43 to the operative position, a cam portion 46 on the lever engages in a slot 47 in the end of the shaft 32 and thereby couples the lever to the shaft, at the same time forcing the trunnion 45 and sleeve 39 to the left, as seen in the drawing, against the action of the spring 41 so that the drive teeth 36, 37, 40 are disengaged.

The lever 42 will only engage with the slot 47 in the spool drive shaft 32 in one relative angular position of the shaft and lever, thereby ensuring that the manual lever positions will always provide the same system responses.

FIG. 6 shows an arrangement whereby the valve spool can be automatically centred or nulled. This may be done as a direct control action or so arranged that it results from a control power failure, i.e. the arrangement is such that the application of hydraulic pressure frees the spool for movement by the motor, while power failure results in the spool being returned to and locked in a centred position.

The valve spool 11 has a coupling rod 48 extending from one end thereof into centring cylinder 49 where a head 50 on the rod 48 is located between a pair of spring-urged centring pistons 51. When hydraulic pressure enters the cylinder 49 through a port 52 mid-way along the cylinder, the pistons 51 are forced back against the action of their springs 53 thereby allowing freedom of movement to the head 50 on the rod 48. In the absence of fluid pressure the pistons 51 are urged by their springs against opposite sides of a centre stop 54 thereby centring and trapping the head 50 and likewise the spool 11.

The spool 11 is operated by the drive motor (not shown) through a leadscrew 55 and nut 56. A pair of leadscrew guide rollers 57 are urged against opposite sides of the leadscrew shank which has a plain turned surface. The guide rollers 57 are mounted on spindles 58 which can be angularly adjusted by piston-and-cylinder units 59 acting through cranks 60. When hydraulic pressure is applied to the cylinders 59 the guide rollers 57 are turned into line with the leadscrew axis thereby frictionally preventing rotation of the leadscrew. Rotation of the nut 56 will therefore cause solely linear movement of the leadscrew 55. In the absence of fluid pressure, springs in the cylinder units 59 cause the guide rollers 57 to turn to match the helix angle of the threads on the leadscrew, thereby allowing the lead-screw to rotate. This enables the centring pistons 51 to move the spool and leadscrew to the centred position.

The leadscrew guide roll arrangement can also be arranged to provide spool operation in a combined linear and rotary motion. The angle at which the guide rolls are set to the axis of the leadscrew will determine the ratio of linear to rotary motion. Control of the angle can be used to control the amount of linear movement with respect to motor rotation and hence control the effective gain. The rotary motion will also tend to reduce the force required to move the spool in contaminated fluid and reduce the risk of linear scoring of spool and sleeve.

The arrangements described have been shown operating a spool valve which provides the means of directly controlling the direction and flow of fluid in a hydraulic system where the flow is generated by means of a flow and pressure generating pump such as a gear pump, eccentric vane pump, piston pump etc. and where the hydraulic fluid flow is the means of transmitting power and causing and controlling the movement and position of machines or parts of machines.

The principle and means described may also be applied to control the generation, as well as the direction, of flow in a hydraulic or hydrostatic system where the means of generating the flow and determining the amount and direction of flow is a swash plate pump. In this case the movement and position of the swash plate can be controlled by operation of the type of valve arrangement shown in FIGS. 1 to 3, to direct the flow of a charge pump to the piston which governs the angle of the swash plate and hence controls the amount and direction of fluid flow in the main machine system.

Where an axial piston device is used as a motor whose rotation is controlled by the angle of a swash plate, a motor-driven valve as described herein can be used to control the swash angle, either by controlling the main system fluid flow into the swash plate actuator pistons, or by controlling a separately generated fluid flow for the same purpose. With an arrangement such as is shown in FIG. 4, the piston could be coupled so as to control the swash plate of either a pump or a motor.

The electro-hydraulic servo valve may be used to control position or speed of movement, or both speed and position, of machines or parts of machines, feedback transducers appropriate to the requirements being incorporated.

A system designed to control a valve driven by a stepper motor can be arranged so that when a command/feedback error exists it will output a number of drive pulses which will be related to the magnitude of the error and switched so that the direction of rotation which results will cause movement of the valve spool such that it takes up a predetermined position directly related to the error, e.g. at the zero error the spool will take up a null position.

The spool position feedback information may be derived either directly from a spool position feedback transducer, or indirectly from a stepper drive output pulse count system.

What I claim is:

1. An electro-hydraulic servo valve assembly for regulating the amount or pressure of hydraulic fluid supplied to a hydraulically-operated machine system, comprising a ported valve sleeve, a progressively rectilinearly movable valve spool controlling ports in said valve sleeve, a rotary motive power unit, coupling means including a leadscrew and nut mechanism coupling the drive of the motive power unit to the valve spool, a valve spool position transducer supplying a feedback signal representative of the instantaneous position of the valve spool, electrical control means controlling the energization of the motive power unit in accordance with input command signals and the feedback signal, means for centering the valve spool in the absence of hydraulic pressure, and hydraulically-operated means locking the leadscrew against rotation when hydraulic pressure is present and unlocking to allow the leadscrew to rotate in the absence of hydraulic pressure to permit the valve spool to be centered.

2. A valve assembly according to claim 1, wherein the centering means comprises a pair of spring-loaded pistons that are held apart by the hydraulic pressure, and move toward one another in the absence of hydraulic pressure thereby trapping between them a head on a member coupled to the valve spool.

3. A valve assembly according to claim 1, wherein the leadscrew locking means comprises guide rollers that engage a plain surface of the leadscrew and are angularly adjustable between a position in which they are in line with the leadscrew axis and a position in which they are set at the leadscrew helix angle.

* * * * *